July 18, 1961 L. PIERCE ET AL 2,993,152
SHIELDS FOR MAGNETS
Filed July 18, 1957

WITNESSES:
Bernard R. Gieguey
Wm. B. Sellers

INVENTORS
Lawrence Pierce and
Marshall P. White.
BY
Frederick Shape
ATTORNEY

United States Patent Office 2,993,152
Patented July 18, 1961

2,993,152
SHIELDS FOR MAGNETS
Lawrence Pierce, Williamsville, and Marshall P. White, Cheektowaga, N.Y., assignors to Westinghouse Electric Corporation, East Pittsburgh, Pa., a corporation of Pennsylvania
Filed July 18, 1957, Ser. No. 672,817
5 Claims. (Cl. 317—201)

The invention relates generally to shields for magnets and more particularly to shields for magnets used in apparatus where it is required that the magnetic field be not subjected to any substantial change irrespective of whether or not the magnet is brought into close proximity to magnetic material.

In many instruments, control apparatus and electrical equipment of all kinds, magnets both permanent and electromagnetic are employed for performing predetermined functions. It is common to give these instruments, control equipment and other apparatus a rating which depends on the conditions under which the instruments, control apparatus and other equipment are calibrated. When such equipment is sold and installed in plants, it is often used in close proximity to magnetic material which affects the magnets employed. As a result, the instruments and control apparatus may not function as anticipated or in accordance with ratings.

The object of the invention is to provide for so shielding a magnet that there is substantially no change in the magnetomotive force of the magnet available for performing its function even though it is located in close proximity to magnetic material.

It is also an object of the invention to provide apparatus equipped with magnets that are so shielded that they are unaffected by their proximity to magnetic materials and will function according to ratings under all conditions.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figure 5:
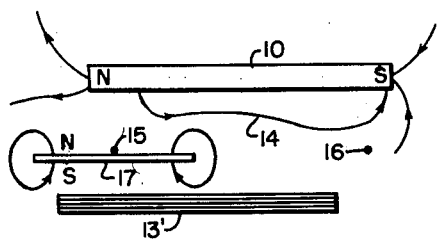
Figure 6:
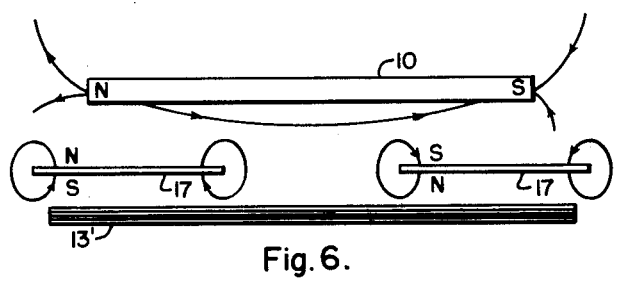

FIG. 5 is a view in side elevation of a permanent magnet showing it shielded by a ceramic permanent magnet disposed between the magnet and magnetic core; and FIG. 6 is a view in side elevation of a permanent magnet showing both the north and south poles of the magnet shielded by ceramic permanent magnets disposed adjacent opposite ends of the magnet and between the magnet and magnetic core, the lines representing magnetic flux illustrating how the magnetic field is affected.

The invention involves the providing of shields for magnets, either of the permanent or the electromagnetic type, to prevent any substantial changes from occurring in the magnetic field and the magnetomotive force available for performing the function the magnet is intended to perform in the instruments, control apparatus and other equipment, irrespective of the environment in which the magnet is put into service.

In order to emphasize the effect of environment or of magnetic materials located in the area or in close proximity to the place where the magnet is installed, a short description will be given of how magnetic materials affect the fields of magnets, either permanent magnets or electromagnets.

It is to be understood that the description given in connection with the permanent magnet will also apply in the case of an electromagnet. Of course, in the case of an electromagnet, if the conditions which will affect the operation of the magnet in service are known, it is easier to compensate for adverse operating conditions.

Figure 1:
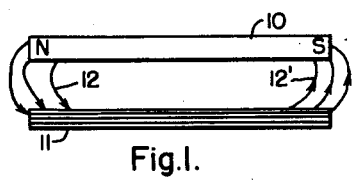
FIGURE 1 is a view in side elevation of a permanent magnet and laminated iron core disposed in such relationship to one another that the permanent magnet magnetizes the core.

Referring now to FIG. 1, the permanent bar magnet 10 is disposed in a predetermined reation to the core 11 for the purpose of magnetizing the latter. The lines of flux will flow from the north pole of the magnet into the laminated core 11 as illustrated generally by the lines 12. At the other end of the core the lines of flux will flow from the core back to the south pole of the magnet as illustrated generally by the lines 12'. All of the lines of flux will remain in the core 11 in flowing from one end to the other. This is because the laminated iron core is a much easier path for the lines of flux than the air. The same magnetomotive force in the magnet 10 will cause a great many more lines of flux to flow through the core 11 than will be caused to flow in a magnetic field in air.

If an electromagnet were substituted for the permanent magnet 10, the lines of flux also would flow in the laminated iron core in the manner illustrated in FIG. 1. The only difference is that in the case of the electromagnet the magnetomotive force may be varied by changing the number of turns of conductor around the magnet core and the amount of current caused to flow.

Figure 2:
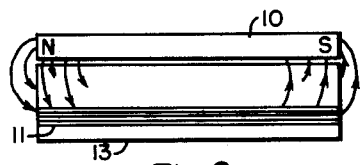
FIG. 2 is a view in side elevation of the magnet and core shown in FIG. 1 with a member of magnetic material disposed in close relation thereto showing how the magnetic field is changed by the member or mass of magnetic material.
Figure 3:
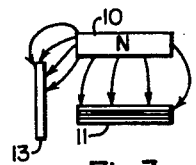
FIG. 3 is a view in end elevation of the member shown in FIG. 2 to illustrate how the magnetic field is changed.

Referring now to FIGS. 2 and 3, if a mass of magnetic material 13 is brought close enough to the magnet 10 and the core 11 for the flux to reach it, the magnetic field is substantially changed. As shown in both figures, a certain number of the lines of flux will flow from the magnet 10 through the member 13 and thus the magnetization of the core 11 will be affected. The main effect will be a lowering of the density of the lines of flux in the core 11. This illustrates how a magnet if not shielded can be affected by locating it in close proximity to a mass of magnetic material. If the magnet 10 is part of an instrument or control apparatus or other electrical equipment, it may not perform the function which it was intended to perform. Consequently, ineffective operation of equipment may result.

Ceramic permanent magnets have different characteristics from ordinary permanent magnets. The permeability of a ceramic permanent magnet such as barium ferrite is very close to unity. Consequently, it is somewhat like air and has no saturation point. The amount of flux a ceramic permanent magnet will carry may be varied by changing its cross-sectional area. Further, when a ceramic permanent magnet such as barium ferrite is demagnetized, it will, on the cessation of the demagnetizing operation, regain its original magnetic condition. This is not the case with ordinary permanent magnets.

Figure 4:
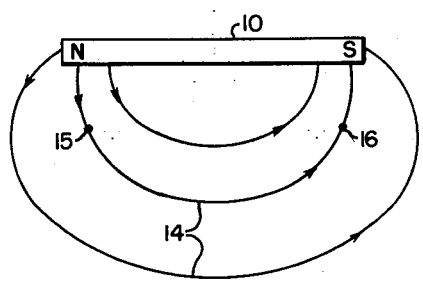
FIG. 4 is a view in side elevation of a permanent magnet with lines illustrating the magnetic field emanating from the magnet.

Referring now to FIG. 4, the permanent bar magnet 10 is shown with lines 14 emanating from the north pole and returning to the south pole in loop fashion illustrating the way in which the lines of flux flow. For purposes of explanation, two points 15 and 16 will be picked as shown inside this magnetic field, and since flux is flowing from 15 and 16, there must be a magnetomotive force causing the flux to flow. If a mass of magnetic material such as the laminated iron core 13' of FIG. 5 is placed to extend from 15 to 16, the flux will definitely flow in the mass of magnetic material. If a ceramic permanent magnet such as 17 made in the form of a wafer relatively large in cross-section and short from the north pole to the south pole is placed with its center above point 15 between the magnet 10 and core 13' with the north pole uppermost, it will oppose the flow of flux from the north pole to the south pole of magnet 10. In other words, the magnetomotive force of permanent magnet 10 and magnetomotive force of the ceramic permanent magnet 17 are disposed in opposition to one another. The result is a change in the magnetic field as shown by the lines 14 in FIG. 5. If the ceramic permanent magnet 17 has a magnetomotive force equal to that of the permanent magnet 10, the magnetic field will be substantially eliminated.

Assuming that the mass of magnetic material 13 is brought into close proximity to the permanent magnet 10 but still disposed outside of the ceramic permanent magnet 17, then substantially no lines of flux will reach the mass of magnetic material 13. Therefore, the flux flowing in the permanent magnet 10 and the magnetic field around it will be substantially unaffected. The permanent magnet 10 if installed in an instrument or control apparatus will continue to perform the function for which it was designed. The ceramic permanent magnet 17 serves as an effective shield.

As shown in FIG. 6, ceramic permanent magnet 17 may be disposed in any position desired around the permanent magnet 10 depending upon the shielding it is desired to effect. In this embodiment of the invention permanent magnet shields are disposed at opposite ends of the permanent magnet 10. The ceramic permanent magnet 17 disposed adjacent the north pole of the permanent magnet 10 has its north pole uppermost while the permanent magnet 17 disposed adjacent the south pole of the permanent magnet 10 has its south pole uppermost. When two ceramic permanent magnets are employed as shown in FIG. 6, they constitute an effective shield for preventing any distortion of the flux or field of the permanent magnet 10.

The description has been limited to the shielding of a permanent magnet, but it can be utilized just as effectively in connection with an electromagnet. In the case of an electromagnet it will be necessary to so design the ceramic permanent magnet that it will compensate for a certain degree of variation in the flux in the electromagnet.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:

1. In a shielded magnet structure, in combination, an elongated metallic permanent magnet having a predetermined magnetomotive force causing a magnetic field around the metallic permanent magnet, at least one ceramic permanent magnet with a permeability close to unity disposed in close proximity at the exterior of an end of the elongated permanent magnet, but not in contact with the metallic permanent magnet, the magnetomotive forces of the metallic magnet and the ceramic permanent magnet being equal and in opposition, whereby when a member of magnetic material is disposed close to the associated ceramic and metallic magnets, the ceramic permanent magnet being disposed between the metallic magnet and the magnetic material, there is no substantial change in the density of the lines of flux in the area between the metallic magnet and the ceramic magnet.

2. In a shielded magnet structure, in combination, an elongated metallic permanent magnet having a predetermined magnetomotive force and a magnetic field emanating from poles at the ends of the magnet, and a relatively flat ceramic permanent magnet with a permeability close to unity and of substantially the same magnetomotive force, and having poles in the opposite flat faces associated with the metallic permanent magnet to dispose a flat pole area near but spaced from a like pole area of the metallic magnet to restrict the magnetic field of the metallic magnet to an area between them to enable the locating of the associated magnets near other magnetic material without changing substantially the magnetic field in said area.

3. In a shielded magnet structure, in combination, an elongated metallic permanent magnet having a predetermined magnetomotive force capable of producing a magnetic field around the magnet, at least one relatively flat ceramic permanent magnet with a permeability close to unity and of substantially the predetermined magnetomotive force and whose poles are in the flat faces thereof disposed in a predetermined closely spaced, but separated relationship to the metallic magnet, a portion of each of the ceramic permanent magnets extending beyond the end of the elongated permanent magnet, the poles of the metallic magnet and the ceramic permanent magnet being in opposed relationship with a flat pole area of the ceramic magnet near but spaced from the like pole of the metallic magnet to control the magnetomotive force of the metallic magnet producing a magnetic field around the metallic magnet, whereby when foreign magnetic material is brought into close relationship to the associated permanent magnets with the ceramic permanent magnet between the foreign magnetic material and the metallic magnet, there is substantially no change in the characteristics of magnetic flux in the area between the ceramic magnet and the metallic magnet.

4. In a shielded magnet structure, in combination, an elongated permanent metallic magnet having a predetermined magnetomotive force capable of causing a magnetic field around said magnet, a relatively flat ceramic permanent magnet with a permeability close to unity and having poles in the opposite flat faces disposed in close proximity to but spaced from each end of the permanent metallic magnet, a portion of the ceramic magnet extending beyond the end of the permanent magnet, the magnetomotive forces of the permanent metallic magnet and the ceramic permanent magnet being substantially equal but in opposition, whereby when a mass of magnetic material is disposed close to the associated permanent metallic and ceramic magnets, the ceramic permanent magnets disposed at the ends of the permanent magnet cooperate to prevent any substantial change in the magnetic flux density in the area adjacent the metallic magnet due to the proximity of the mass of magnetic material.

5. In a shielded magnet structure, in combination, a first elongated magnet selected from the group consisting of metallic magnets and electromagnets having a predetermined magnetomotive force capable of causing a magnetic field around the first magnet, relatively flat ceramic permanent magnets having a permeability close to unity and having poles in opposite flat faces disposed along at least one side and closely adjacent opposite ends of the first magnet, a portion of the ceramic magnets extending beyond the ends of the first magnet, the flat faces of the ceramic permanent magnets being so disposed that their magnetomotive forces are substantially equal to but in opposition to the magnetomotive force of the first magnet, whereby a magnetic field having a predetermined flux density is established around the first magnet in the area between it and the ceramic permanent magnets, whereby when a mass of magnetic material is disposed close to the associated magnets but outside of the ceramic permanent magnets, the ceramic permanent magnets serve to prevent any substantial change in the magnetic flux in the first magnet in said area as a result of the proximity of the mass of magnetic material.

References Cited in the file of this patent

UNITED STATES PATENTS

| | | |
|---|---|---|
| 2,398,653 | Linlor | Apr. 16, 1946 |
| 2,433,682 | Bradley | Dec. 30, 1947 |
| 2,747,944 | Baermann | May 29, 1956 |